(12) United States Patent
Xiang et al.

(10) Patent No.: US 10,826,171 B2
(45) Date of Patent: Nov. 3, 2020

(54) CONDUCTIVE COVER ASSEMBLY OF TERMINAL AND TERMINAL

(71) Applicant: Guangdong OPPO Mobile Telecommunications Corp., Ltd., Dongguan, Guangdong (CN)

(72) Inventors: Yuanbin Xiang, Guangdong (CN); Tianping Liang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/503,445

(22) Filed: Jul. 3, 2019

(65) Prior Publication Data

US 2019/0326667 A1    Oct. 24, 2019

Related U.S. Application Data

(63) Continuation of application No. PCT/CN2017/119532, filed on Dec. 28, 2017.

(30) Foreign Application Priority Data

Jan. 4, 2017   (CN) .......................... 2017 1 0004668
Jan. 4, 2017   (CN) .......................... 2017 2 0009588

(51) Int. Cl.
   *H01Q 1/44*      (2006.01)
   *H01Q 1/24*      (2006.01)
   *H01R 4/48*      (2006.01)

(52) U.S. Cl.
   CPC .............. *H01Q 1/44* (2013.01); *H01Q 1/243* (2013.01); *H01R 4/48* (2013.01)

(58) Field of Classification Search
   CPC ............. H01G 1/44; H01G 1/243; H01R 4/48
   See application file for complete search history.

(56) References Cited

U.S. PATENT DOCUMENTS

| | | | |
|---|---|---|---|
| 2016/0116948 A1 | 4/2016 | Ou et al. |
| 2016/0134010 A1 | 5/2016 | Yan |
| 2018/0254543 A1 | 9/2018 | Wang et al. |

FOREIGN PATENT DOCUMENTS

| | | |
|---|---|---|
| CN | 202374260 U | 8/2012 |
| CN | 103178344 A | 6/2013 |
| CN | 103367865 A | 10/2013 |

(Continued)

OTHER PUBLICATIONS

European search report, EP17890606, dated Oct. 23, 2019 (10 pages).

(Continued)

*Primary Examiner* — Graham P Smith (57) ABSTRACT

A conductive cover assembly of a terminal includes a first portion, a second portion, a conductive suspension strip, a connector, a conductive member and a resilient sheet. The second portion and the first portion have a gap therebetween. The conductive suspension strip is located within the gap. Insulating layer are provided between the conductive suspension strip and the first portion and between the conductive suspension strip and the second portion. The connector spans the gap and is connected to the first portion and the second portion. The conductive member is provided on a side of the connector away from the gap, and is electrically connected to the first portion and the resilient sheet. A terminal is also provided.

20 Claims, 6 Drawing Sheets

(56) References Cited

FOREIGN PATENT DOCUMENTS

| CN | 105098332 | A | 11/2015 |
|----|-----------|---|---------|
| CN | 105530787 | A | 4/2016 |
| CN | 105789827 | A | 7/2016 |
| CN | 105932398 | A | 9/2016 |
| CN | 106537690 | A | 3/2017 |
| CN | 106785353 | A | 5/2017 |
| CN | 206332162 | U | 7/2017 |
| EP | 3021559 | A1 | 5/2016 |
| KR | 100973659 | B1 | 8/2010 |

OTHER PUBLICATIONS

International search report, PCT/CN2017/119532, dated Mar. 14, 2018 (3 pages).

CONDUCTIVE COVER ASSEMBLY OF TERMINAL AND TERMINAL

CROSS-REFERENCE TO RELATED APPLICATION(S)

The present application is a continuation of International (PCT) Patent Application No. PCT/CN2017/119532 filed on Dec. 28, 2017, which claims foreign priorities to Chinese Patent Application No. 201710004668.7 and Chinese Patent Application No. 201720009588.6, both filed on Jan. 4, 2017, the entire contents of all of which are hereby incorporated by reference in their entireties.

TECHNICAL FIELD

The present disclosure relates to the technical field of communication equipment, specifically and particularly to a conductive cover assembly of a terminal and a terminal.

BACKGROUND

In the art related, a terminal with a rear cover totally made of metal is used. In order to meet requirements for antenna design, a conventional practice is to define a gap on the rear cover to radiate signals outward. However, in existing methods, antenna signals are vulnerable to external interference, and how to improve intensity of the antenna signals is one of technical problems that need to be urgently solved. In addition, after an antenna assembly is disposed in an interior of the housing of the terminal, it is prone to fall off during long-term use, vibration, or drop experiments of the terminal, thereby resulting in a decrease in signal radiation capability and affecting use of the terminal.

SUMMARY

According to an aspect of the present disclosure, a conductive cover assembly of the terminal is provided. The conductive cover assembly includes: a first portion; a second portion, wherein a gap is defined between the second portion and the first portion to space the first portion and the second portion apart; a conductive suspension strip located within the gap, a length of the conductive suspension strip being equal to a length of the gap, insulating layers being provided between the conductive suspension strip and the first portion and between the conductive suspension strip and the second portion; a connector spanning the gap and connected to the first portion and the second portion respectively; a conductive member attached to a side of the connector away from the gap, an end of the conductive member being electrically connected to the first portion; and a resilient sheet adapted to be electrically connected to a signal source, the resilient sheet being electrically connected to the conductive member.

According to another aspect of the present disclosure, a conductive cover assembly of the terminal is provided. The conductive cover assembly includes: a first portion; a second portion; a conductive strip sandwiched between the first portion and the second portion and separating the first portion from the second portion, a first insulating layer being provided between the conductive strip and the first portion, and a second insulating layer being provided between the conductive strip and the second portion; a connector spanning the conductive strip and connected to the first portion and the second portion respectively; a conductive member attached to a side of the connector away from the conductive strip, an end of the conductive member being electrically connected to the first portion; and a resilient sheet adapted to be electrically connected to a signal source, the resilient sheet being electrically connected to the conductive member.

According to another aspect of the present disclosure, a terminal is provided. The terminal includes an antenna assembly and a conductive cover assembly. The conductive cover assembly includes: a first portion; a second portion; a conductive strip sandwiched between the first portion and the second portion and separating the first portion from the second portion, a first insulating layer being provided between the conductive strip and the first portion, and a second insulating layer being provided between the conductive strip and the second portion; a connector spanning the conductive strip and connected to the first portion and the second portion respectively; a conductive member attached to a side of the connector away from the conductive strip, an end of the conductive member being electrically connected to the first portion; and a resilient sheet adapted to be electrically connected to a signal source, the resilient sheet being electrically connected to the conductive member. The antenna assembly is electrically connected to the first portion.

DETAILED DESCRIPTION

Embodiments of the present disclosure will be described in detail below, and examples of the embodiments will be illustrated in the accompanying drawings. The embodiments described below with reference to the drawings are illustrative and are intended to explain the present disclosure, and cannot be construed as a limitation to the present disclosure.

In the description of the present disclosure, it is to be understood that terms such as "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", "circumferential", and the like, refer to the orientations and locational relations illustrated in the accompanying drawings. Thus, these terms used here are only for describing the present disclosure and for describing in a simple manner, and are not intended to indicate or imply that the device or the elements are arranged to locate at the specific directions or are structured and performed in the specific directions, which could not to be understood as limiting the present disclosure.

In addition, terms such as "first", "second", and the like are used herein for purposes of description, and are not intended to indicate or imply relative importance or significance or to imply the number of indicated technical features. Thus, the feature defined with "first", "second", and the like may include one or more of such a feature. In the description of the present disclosure, "a plurality of" means two or more, such as two, three, and the like, unless specified otherwise.

In the present disclosure, unless specified or limited, otherwise, terms "mounted", "connected", "coupled", "fixed", and the like are used in a broad sense, and may include, for example, fixed connections, detachable connections, or integral connections; may also be mechanical or electrical connections; may also be direct connections or indirect connections via intervening structures; may also be inner communications of two elements or the interaction of two elements, unless explicitly defined otherwise. For those skilled in the art, the specific meanings of the above terms in the present disclosure can be understood depending on specific contexts.

A conductive cover assembly 100 of a terminal 200 and the terminal 200 according to embodiments of the present disclosure will be described below in detail with reference to FIG. 1 to FIG. 6.

As shown in FIG. 1 to FIG. 5, the conductive cover assembly 100 of the terminal 200 according to the embodiments of the present disclosure includes: a first portion 110, a second portion 120, a conductive suspension strip 130, a connector 150, a conductive member 160, and a resilient sheet 170 adapted to be electrically connected to a signal source 221. It should be noted that, the conductive cover assembly 100 means that body parts of the conductive cover assembly 100 (e.g., the first portion 110 and the second portion 120) may be made of a conductive material, or may be made of an insulating material, with conductive treatment (such as application of a conductive coating) performed on the insulating cover assembly. In addition, the conductive cover assembly 100 may mean that the body parts of the cover assembly (e.g., the first portion 110 and the second portion 120) have an electrical conducting property, and may also mean that part of the areas of the body parts (e.g., the first portion 110 and the second portion 120) on the cover assembly has an electrical conducting property. Correspondingly, the material and electrical conducting property of the conductive suspension strip 130 can be understood in a similar manner, and relevant details are not described herein.

Figure 1:
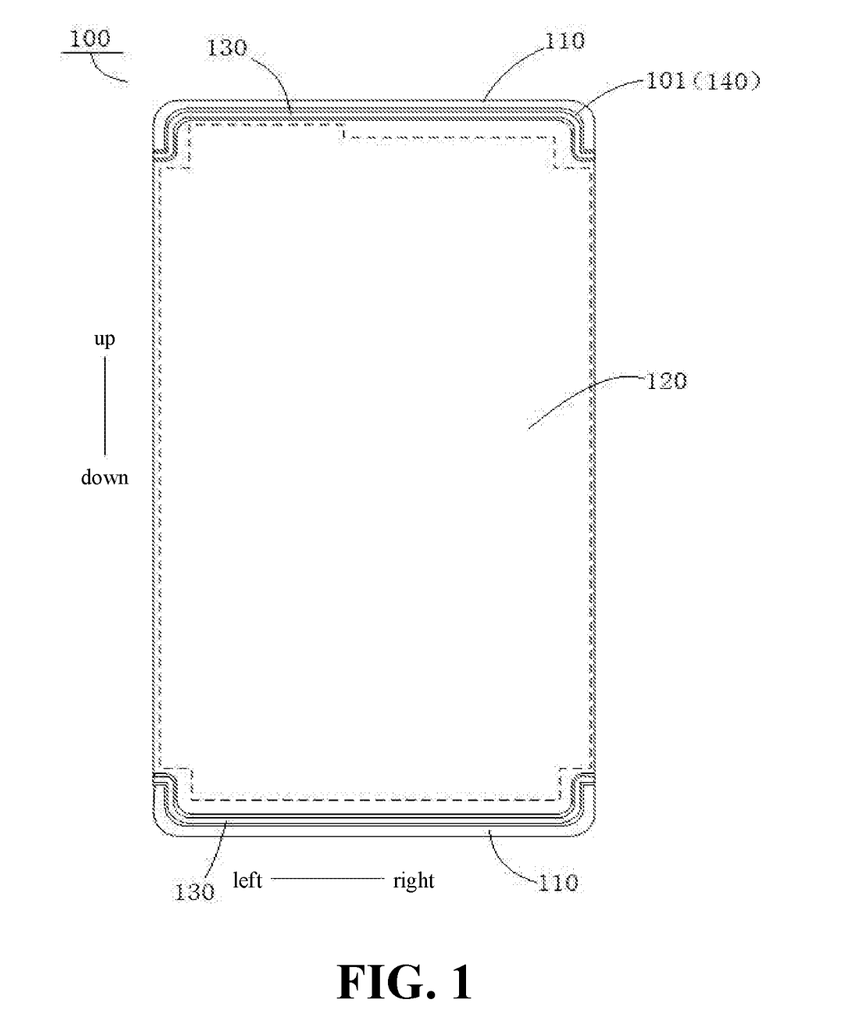
FIG. 1 is a structural diagram of a conductive cover assembly of a terminal according to an embodiment of the present disclosure.

Specifically, there is a gap 101 between the second portion 120 and the first portion 110 to space the first portion 110 and the second portion 120 apart. The conductive suspension strip 130 is located within the gap 101, and a length of the conductive suspension strip 130 is equal to a length of the gap 101. In other words, the conductive suspension strip 130 has a same shape and size as the gap 101. An insulating layer 140 is disposed between the conductive suspension strip 130 and the first portion 110 and also between the conductive suspension strip 130 and the second portion 120. It can be understood that the conductive cover assembly 100 is provided with the gap 101 which runs through two opposite sidewalls of the conductive cover assembly 100 (for example, as shown in FIG. 1, the gap 101 runs through the left sidewall and the right sidewall of the conductive cover assembly 100) to divide the conductive cover assembly 100 into the first portion 110 and the second portion 120 and within which the conductive suspension strip 130 is provided. That is, the first portion 110, the conductive suspension strip 130, and the second portion 120 are arranged in an alternate and spaced manner; and the first portion 110 is insulatively connected to the conductive suspension strip 130, and the conductive suspension strip 130 is insulatively connected to the second portion 120, thereby forming a complete conductive cover assembly 100

Figure 4:
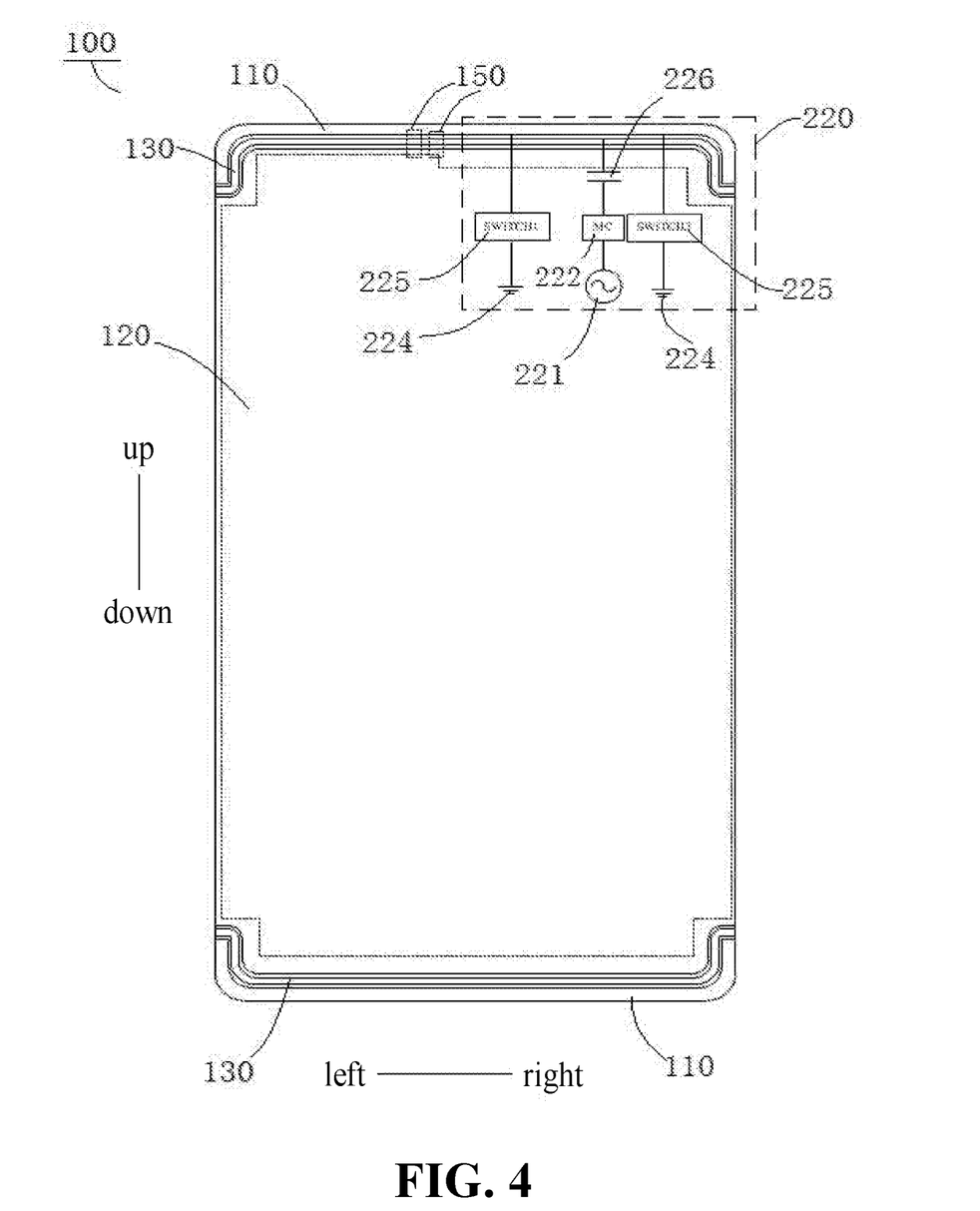
FIG. 4 is a structural diagram of a conductive cover assembly of a terminal according to an embodiment of the present disclosure.
Figure 5:
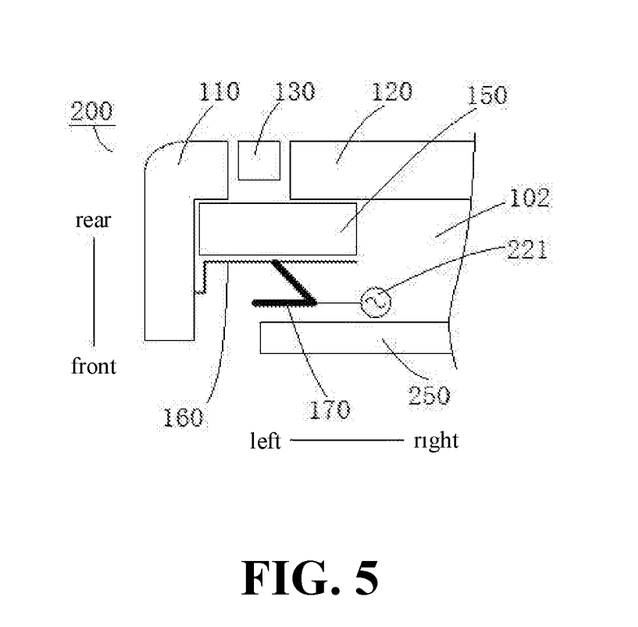
FIG. 5 is a partial structural diagram of a terminal according to an embodiment of the present disclosure.
Figure 6:
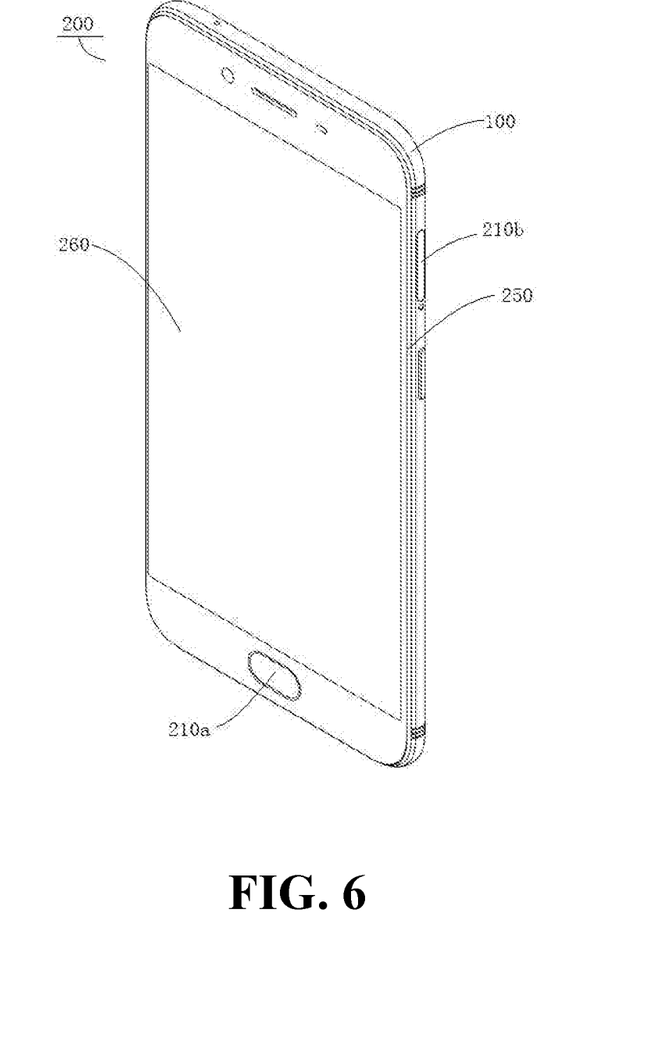
FIG. 6 is a structural diagram of a terminal according to an embodiment of the present disclosure.

As shown in FIG. 4 and FIG. 5, the connector 150 spans the gap 101 and is connected to the first portion 110 and the second portion 120, respectively. It should be noted that the connector 150 is an insulating connector, and an injection-molded connector 150 which can be formed on the conductive cover assembly 100 via an injection molding process, whereby processing of the conductive cover assembly 100 can be simplified. The connector 150 can be configured not only to connect the first portion 110 and the second portion 120, but also to support other components within the conductive cover assembly 100 (e.g., the conductive member 160).

As shown in FIG. 4 and FIG. 5, the conductive member 160 is attached to a side of the connector 150 away from the gap 101 (for example, the conductive member 160 is attached to a front side surface of the connector 150); an end of the conductive member 160 is electrically connected to the first portion 110; and the resilient sheet 170 is electrically connected to the conductive member 160. By attaching the conductive member 160 to the connector 150 and making electrical connection to the conductive member 160 via the resilient sheet 170, it is possible to enhance stability of connection between the conductive member 160 and the connector 150. It should be noted that, as shown in FIG. 4, a signal source 221, an antenna switch 225, an earthing point 224 (or called a feed point) and a tuner (for example, a first tuner 223 or a second tuner 230) of antenna assembly 220 all can be electrically connected to the conductive member 160 through the resilient sheet 170.

In order to improve stability of connection between the conductive member 160 and the first portion 110, the conductive member 160 may be connected to the first portion 110 by welding. For example, the connection between the conductive member 160 and the first portion 110 can be achieved by a welding process, for example, ultrasonic welding or laser welding. Of course, the connection between the conductive member 160 and the first portion 110 can also be achieved in a manner of a lock screw.

In the conductive cover assembly 100 of the terminal 200 according to the embodiment of the present disclosure, it is possible to enhance stability of connection between the conductive member 160 and the connector 150, by attaching the conductive member 160 to the connector 150 and making electrical connection to the conductive member 160 via the resilient sheet 170. Furthermore, by connecting the first portion 110 and the second portion 120 via the connector 150 and further making electrical connection to the first portion 110 via the conductive member 160, the first portion 110 can directly serve as a part of the antenna assembly 220 to improve signal radiation capability and anti-interference capability of the antenna assembly 220, thereby making it possible to enhance intensity of the antenna signals and simplify the structure of the terminal 200.

According to an embodiment of the present disclosure, a thickness of the insulating layer 140 may be 0.05 mm to 0.5 mm. It has been experimentally verified that, when the thickness of the insulating layer 140 is 0.1 mm to 0.5 mm, the terminal 200 has a relatively good signal radiation performance and the strongest anti-interference capability. Further, it has been experimentally verified that, when the thickness of the insulating layer 140 is 0.3 mm, the terminal 200 has a better signal radiation performance and a stronger anti-interference capability.

Figure 2:
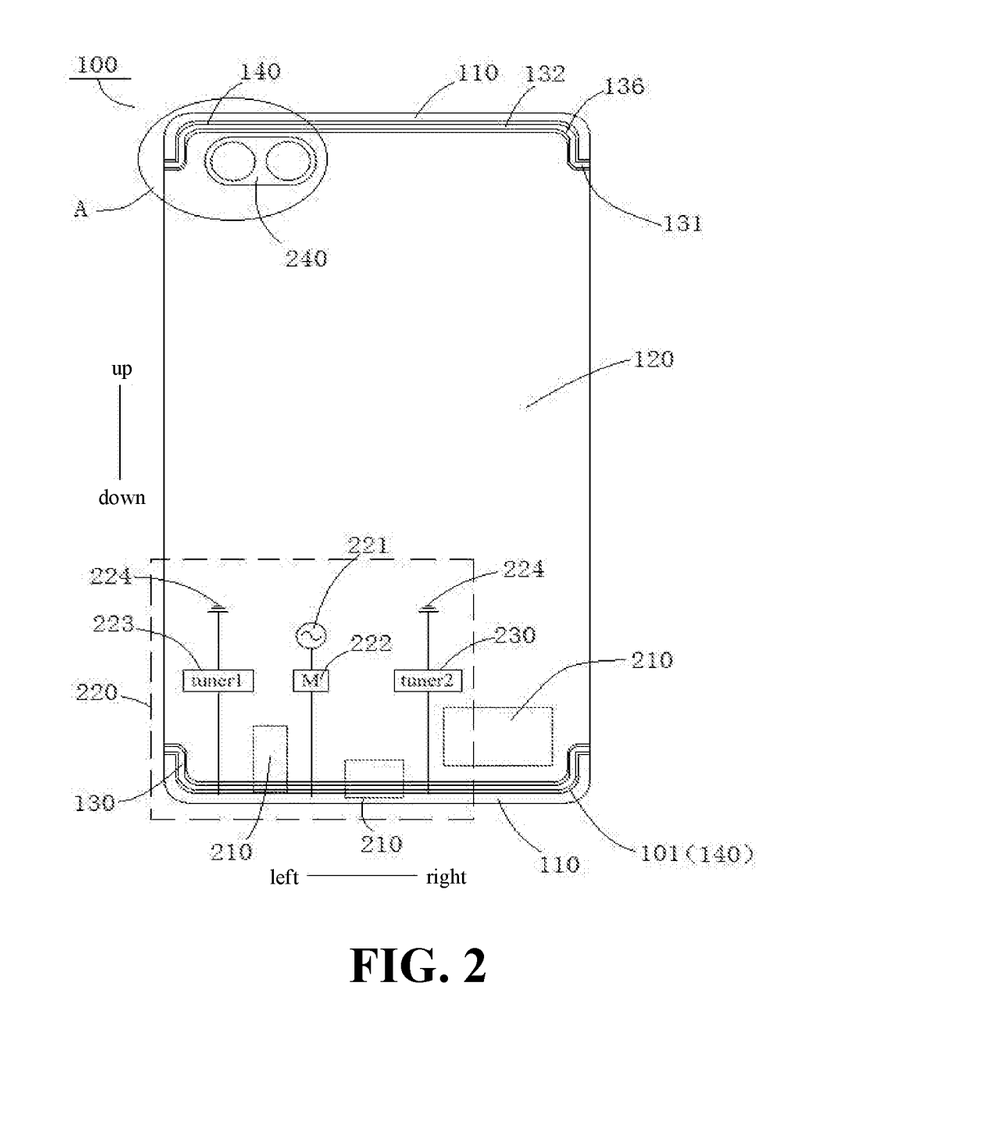
FIG. 2 is a structural diagram of a conductive cover assembly of a terminal according to an embodiment of the present disclosure.
Figure 3:
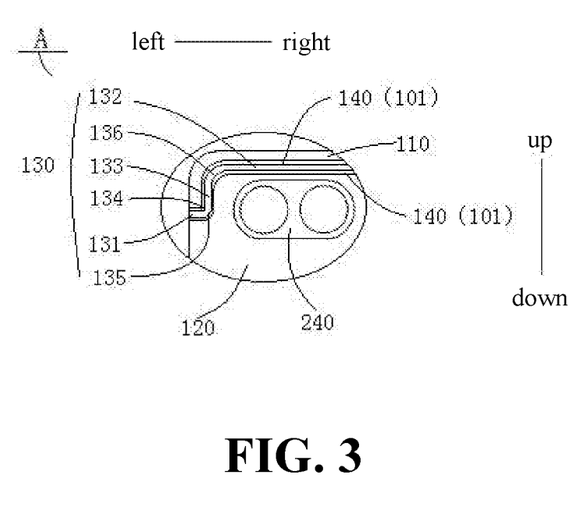
FIG. 3 is a partially enlarged diagram of a location A in FIG. 2.

As shown in FIG. 1 to FIG. 3, in an embodiment of the present disclosure, the conductive suspension strip 130 includes: two first straight sections 131 spaced apart, a second straight section 132, and two vertical connection sections 133. Therein, the second straight section 132 is located between the two first straight sections 131. Moreover, the second straight section 132 is located on a side of the first straight section 131 and is parallel to the first straight section 131. An extending direction of the vertical connection sections 133 is perpendicular to an extending direction of the first straight sections 131. Two ends of each of the vertical connection sections 133 are connected to the corresponding first straight section 131 and second straight section 132, respectively.

For example, as shown in FIG. 1 and FIG. 3, the conductive suspension strip 130 extends in a left-right direction; the first straight section 131 and the second straight section 132 extend in a horizontal direction (i.e., extend in a left-right direction as shown in FIG. 1 and FIG. 3); the first straight section 131 and the second straight section 132 are spaced apart in an up-down direction (i.e., an up-down direction as shown in FIG. 1 and FIG. 3); and the two first straight sections 131 are located at two ends of the second straight section 132 in the left-right direction. The vertical connection section 133 extends in an up-down direction (i.e., an up-down direction as shown in FIG. 1 and FIG. 3); one of the two vertical connection sections 133 is configured to connect the first straight section 131 located on the left side and the left end of the second straight section 132; and the other of the two vertical connection sections 133 is configured to connect the first straight section 131 located on the right side and the right end of the second straight section 132.

In an embodiment of the present disclosure, as shown in FIG. 3, a right angle 134 is formed between a sidewall face of the first straight section 131 oriented toward the first portion 110 and the corresponding vertical connection section 133. For example, as shown in FIG. 3, the first straight section 131 on the left side is connected to the vertical connection section 133 on the left side; and a right angle 134 is formed at a position where the sidewall face of the first straight section 131 oriented toward the first portion 110 (i.e., the upper sidewall face of the first straight section 131 located as shown in FIG. 3) and the vertical connection section 133 are connected. It has been experimentally verified that, the anti-interference capability of the antenna assembly 220 will be enhanced when the right angle 134 is formed between the sidewall face of the first straight section 131 oriented toward the first portion 110 and the corresponding vertical connection section 133.

In another embodiment of the present disclosure, as shown in FIG. 3, a round corner 135 is formed between a sidewall face of the first straight section 131 oriented toward the second portion 120 and the corresponding vertical connection section 133. For example, as shown in FIG. 3, the first straight section 131 on the left side is connected to the vertical connection section 133 on the left side. A round corner 135 is formed at a position where the sidewall face of the first straight section 131 oriented toward the second portion 120 (i.e., the lower sidewall face of the first straight section 131 located as shown in FIG. 1) is connected to the vertical connection section 133. It has been experimentally verified that, the anti-interference capability of the antenna assembly 220 will be enhanced when the round corner 135 is formed between the sidewall face of the first straight section 131 oriented toward the second portion 120 and the corresponding vertical connection section 133.

According to still another embodiment of the present disclosure, a smooth transition connection 136 is provided between the second straight section 132 and the vertical connection sections 133. It can be understood that the smooth transition connection 136 is provided between the vertical connection section 133 on the left side and the left end of the second straight section 132, and the smooth transition connection 136 is also provided between the vertical connection section 133 on the right side and the right end of the second straight section 132. For example, as shown in FIG. 3, the vertical connection section 133 on the left side and the left end of the second straight section 132 are connected to each other via a circular arc line segment (i.e., the smooth transition connection 136). It has been experimentally verified that, the anti-interference capability of the antenna assembly 220 can be enhanced when the second straight section 132 is smoothly connected to the vertical connection section 133.

According to an embodiment of the present disclosure, as shown in FIG. 5, the conductive cover assembly 100 includes a cover body and a cover side plate surrounding a periphery of the cover body. The cover body and the cover side plate define a mounting cavity 102 with one side open. The connector 150, the conductive member 160 and the resilient sheet 170 are all located within the mounting cavity 102. The first portion 110 is configured as the cover side plate, and the second portion 120 is configured as the cover body. Thereby, the structure of the conductive cover assembly 100 can be simplified, and the appearance expression thereof can be improved.

According to an embodiment of the present disclosure, there are a plurality of connectors 150, conductive members 160 and spring leaves 170; and the plurality of connectors 150, the plurality of conductive members 160 and the plurality of spring leaves 170 are in one-to-one correspondence, which facilitates arrangement of signal components on the conductive cover assembly 100. In an embodiment of the present disclosure, as shown in FIG. 1, gaps 101 on the conductive cover assembly 100 may be two, and the two gaps 101 may divide the conductive cover assembly 100 into two first portions 110 and one second portion 120, where the two first portions 110 are located at two upper and lower ends of the second portion 120, and each of the gaps 101 is provided with a conductive suspension strip 130.

According to an embodiment of the present disclosure, as shown in FIG. 5, a length of the conductive suspension strip 130 is equal to a length of the gap 101. That is to say, the conductive suspension strip 130 has a same shape and size as the gap 101. According to some embodiments of the present disclosure, a rear surface (i.e., a surface on the rear side as shown in FIG. 5) of the conductive suspension strip 130 is flush with a rear surface (i.e., a surface on the rear side as shown in FIG. 5) of the second portion 120. Thereby, not only the appearance of the cover assembly 100 can be improved, but also the antenna performance and anti-interference capability of the cover assembly 100 can be improved. Further, a thickness of the conductive suspension strip 130 in a front-rear direction (i.e., a front-rear direction as shown in FIG. 5) is smaller than a thickness of the second portion 120 in a front-rear direction (i.e., a front-rear direction as shown in FIG. 5). In other words, the conductive suspension strip 130 can extend into the gap 101 in the front-rear direction. As shown in FIG. 5, a depth with which the conductive suspension strip 130 extends into the gap 101 is smaller than a depth of the gap 101 in the front-rear direction.

As shown in FIG. 1 to FIG. 6, the terminal 200 according to the embodiments of the present disclosure includes an antenna assembly 220 and the conductive cover assembly 100 of the terminal 200 as described above.

It should be noted that, the "terminal" (or "communication terminal") includes) used herein includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN), a digital television network such as a DVB-H network, a satellite network, an AM-FM broadcast transmitter, and/or another communication terminal. A communication terminal that is set to communicate over a wireless interface may be referred to as a "wireless communication terminal", "wireless terminal" and/or "mobile terminal". Examples of the mobile terminal include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Specifically, the antenna assembly 220 is electrically connected to the first portion 110. Thus, the first portion 110 can directly serve as a part of the antenna assembly 220 to improve the signal radiating capability and anti-interference capability of the antenna assembly 220, thereby making it possible to enhance intensity of the antenna signals and simplify the structure of the terminal 200.

In the terminal 200 according to the embodiments of the present disclosure, it is possible to enhance stability of connection between the conductive member 160 and the connector 150, by attaching the conductive member 160 to the connector 150 and making electrical connection to the conductive member 160 via the resilient sheet 170. Furthermore, by connecting the first portion 110 and the second portion 120 via the connector 150 and further making electrical connection to the first portion 110 via the conductive member 160, the first portion 110 can directly serve as a part of the antenna assembly 220 to improve the signal radiation capability and anti-interference capability of the antenna assembly 220, thereby making it possible to enhance intensity of the antenna signals and simplify the structure of the terminal 200.

According to an embodiment of the present disclosure, the terminal 200 may further include an externally-connected seat 210. Therein, the externally-connected seat 210 can be disposed on the conductive cover assembly 100 and spaced apart from the first portion 110 of the conductive cover assembly 100. It should be noted that, the externally-connected seat 210 may be a component such as an earphone jack, a universal serial bus (USB) jack, a fingerprint recognition component 210*a*, a speaker component, or a side key 210*b*. In addition, it needs to be noted that, when the externally-connected seat 210 and the first portion 110 are arranged in a spaced manner, the externally-connected seat 210 can be spaced apart from the first portion 110 by utilizing spatial separation, that is, when the externally-connected seat 210 and the first portion 110 are required to be connected, a manner of indirect connection can be used to realize connection between the externally-connected seat 210 and the first portion 110. When there is no connection between the externally-connected seat 210 and the first portion 110, the externally-connected seat 210 and the first portion 110 are not in contact and connection with each other. Of course, the externally-connected seat 210 and the first portion 110 may also be spaced apart by some means such as magnetic bead or inductor 226 isolation. For example, the USB jack can be arranged to be spatially spaced apart from the first portion 110. For example, a minimum space between the USB jack and the first portion 110 can be 0.5 mm; and an audio line of the speaker component can be isolated by some means such as magnetic bead or inductor 226 separation. The antenna assembly 220 is electrically connected to the first portion 110.

According to an embodiment of the present disclosure, as shown in FIG. 2 and FIG. 4, the antenna assembly 220 includes: a signal source 221, a matching circuit 222, a first tuner 223 (or called tuner 1), and a second tuner 230 (or called tuner 2). Therein, an end of the matching circuit 222 is electrically connected to the resilient sheet 170, and the other end is electrically connected to the signal source 221 and the resilient sheet 170. The first tuner 223 is electrically connected to the first portion 110 and the earthing point 224 respectively; the second tuner 230 and the first tuner 223 are spaced apart; and the second tuner 230 is electrically connected to the first portion 110 and the earthing point 224, respectively.

It should be noted that, the tuner is a switch or a variable capacitor. For example, in the embodiment as shown in FIG. 4, the first tuner 223 and the second tuner may be antenna switches 225, i.e., SWITCH1 or SWITCH2. In a free mode (for example, a state of the terminal 200 when being placed at a certain fixed position), the tuner 1 is configured for medium-high frequency tuning (coordination frequency is 1710M-2170M HZ), and the tuner 2 is configured for low-frequency tuning (coordination frequency is 700M-960M HZ). In the right hand grip (for example, a state in which the user's right hand holds the terminal 200), the tuner 1 is configured to adjust the antenna characteristic impedance, and the tuner 2 is configured for the antenna low frequency (coordination frequency is 700M-960M HZ) and medium-high frequency (coordination frequency is 1710M-2170M HZ) tuning. In the left hand grip (for example, the state in which the user's left hand holds the terminal 200), the tuner 2 is configured to adjust the antenna characteristic impedance, and the tuner 1 is configured for the antenna low frequency (coordinating frequency is 700M-960M HZ) and medium-high frequency (coordinating frequency is 1710M-2170M HZ) tuning. Freedom of the antenna and radiation performance under the grip of the user's hands are improved by switching among the three states.

As shown in FIG. 5, the terminal 200 applicable to the present disclosure is introduced with a mobile phone as an example. In the embodiments of the present disclosure, the mobile phone may include components such as a radio frequency circuit, a memory, an input unit, a wireless fidelity (WiFi) module, a display screen assembly 260, a sensor, an audio circuit, a processor, a projection unit, a camera assembly 240, and a battery, etc. The camera assembly 240 can be a single-camera assembly or a dual-camera assembly.

The radio frequency circuit can be used for receiving and transmitting signals during transmission and reception of information or talking, and particularly, after receiving downlink information from the base station, has the received downlink information processed by the processor. In addition, uplink data of the mobile phone is transmitted to the base station. Generally, the radio frequency circuit includes, but is not limited to, communication antennas, at least one amplifier, transceiver, coupler, low noise amplifier, duplexer, and the like. Further, the radio frequency circuit can also communicate with a network and other devices through wireless communication. The above wireless communication may use any communication standard or protocol, including but not limited to, Global System for Mobile communication (GSM), General Packet Radio Service (GPRS), and Code Division Multiple Access (CDMA), Wideband Code Division Multiple Access (WCDMA), Long Term Evolution (LTE), e-mail, Short Messaging Service (SMS), and the like.

The memory can be configured to store software programs and modules, and the processor executes various functional applications and data processing of the mobile phone by running the software programs and modules stored in the memory. The memory may mainly include a program storage area and a data storage area, where the program storage area may store an operating system, application(s) required by at least one function (such as a sound playing function, an image playing function, etc.), and the like; and the data storage area can store data (such as audio data, phone book, etc.) created according to use of the mobile phone. Further, the memory may include a high-speed random access memory, and may also include a non-volatile memory such as at least one magnetic disk storage means, a flash memory means, or other volatile solid-state storage means.

The input unit can be configured to receive inputted numeric or character information and to generate key signals related to user setting and function control of the mobile phone. Specifically, the input unit may include a touch control panel and other input devices. The touch control panel, also called a touch screen, may collect touch operations of the user thereon or near thereto (such as operations on the touch control panel or near to the touch control panel conducted by the user with any suitable object or accessory, such as finger, a touch-pen, or the like), and drive corresponding connection device according to a preset program. Alternatively, the touch control panel may include two parts, namely, a touch detection device and a touch controller. Therein, the touch detection device detects the user's touch orientation and a signal induced by the touch operation, and transmits the signal to the touch controller. The touch controller receives touch information from the touch detection device, converts the touch information into contact point coordinates then sent to the processor, and can receive and execute commands from the processor. In addition, the touch control panel can be implemented with various types such as resistive type, capacitive type, infrared type, and surface acoustic wave type etc. The input unit may also include other input devices in addition to the touch control panel. Specifically, other input devices may include, but are not limited to, one or more of a physical keyboard, function keys (such as volume control press-key, on-off press-key, etc.), trackballs, mouse, joystick, and the like.

The terminal 200 can include a conductive cover assembly 100 and a front cover 250 which together define a mounting cavity 102. A display screen assembly 260, which is embedded on the front cover 250, can be configured to display information inputted by the user or information provided for the user as well as various menus of the mobile phone. The display screen assembly 260 can include a display panel. Optionally, the display panel can be configured in various forms such as a Liquid Crystal Display (LCD), an Organic Light-Emitting Diode (OLED), or the like. Further, the touch control panel may cover the display panel. After detecting a touch operation thereon or near thereto, the touch control panel transmits the touch operation to the processor to determine a type of the touch event, and then the processor provides corresponding visual output on the display panel according to the type of the touch event.

The position of the visual output recognizable by the human eyes in the display panel can be used as a "display area" described later. The touch control panel and the display panel can be used as two independent components to realize input and output functions of the mobile phone. The touch control panel and the display panel can also be integrated to realize the input and output functions of the mobile phone.

Furthermore, the mobile phone can also include at least one type of sensor, such as a posture sensor, a light sensor, a fingerprint recognition component 210a, and other sensors.

Specifically, the posture sensor may also be called a motion sensor, and as one type of the motion sensor, a gravity sensor may be listed. The gravity sensor uses an elastic-sensitive element to form a cantilever type shifter and drives the electrical contacts by an energy-storing spring made of an elastic-sensitive element, thereby realizing converting gravity variation into gravity into electrical signal variation.

As another type of motion sensor, an accelerometer sensor can be listed. The accelerometer sensor can detect magnitudes of acceleration in each direction (usually three axes), and when being stationary, it can detect the magnitude and direction of gravity, which can be used to identify applications of posture of the mobile phone (such as horizontal and vertical screen switching, related games, magnetometer posture calibration), and vibration recognition related functions (such as pedometer, tapping), etc.

In the embodiments of the present disclosure, the motion sensors listed above may be used as the element to obtain the "posture parameter" described below, but the application is not limited herein, and other sensors capable of obtaining the "posture parameter" fall within the protection scope of the present disclosure, for example, a gyroscope or the like. Moreover, the working principle and data processing procedure of the gyroscope can be similar to the prior art. For the sake of conciseness, a detailed description thereof is omitted herein.

In addition, in the embodiments according to the present disclosure, as sensors, other sensors such as a barometer, a hygrometer, a thermometer, and an infrared sensor, and the like can also be configured, and details are not described herein.

The light sensor may include an ambient light sensor and a proximity sensor, where the ambient light sensor may adjust brightness of the display panel according to intensity of the ambient light rays, and the proximity sensor may turn off the display panel and/or the backlight when the mobile phone moves to the ear.

Audio circuit, speaker, and microphone can provide an audio interface between the user and the mobile phone. The audio circuit can transmit a converted electrical signal of the received audio data to the speaker which converts the electrical signal into a sound signal to be outputted. In another aspect, the microphone converts the collected sound signal into an electrical signal which is received by the audio circuit and converted into audio data; and the audio data is then outputted to the processor for processing, before being sent via the radio frequency circuit to another mobile phone, for example, or the audio data is outputted to a memory for further processing.

WIFI belongs to a short-distance wireless transmission technology. The mobile phone can help the user receive and send emails, browse web pages and access streaming media and the like through the WIFI module, which provides the user with wireless broadband Internet access.

The processor is a control center of the mobile phone, and connects various parts of the entire mobile phone by using various interfaces and lines, and executes various functions of the mobile phone and processes data to monitor the mobile phone as a whole, by running or executing software programs and/or modules stored in the memory and calling data stored in the memory. Alternatively, the processor may include one or more processing units. Preferably, the processor may integrate an application processor and a modem processor. Therein, the application processor mainly processes an operating system, a user interface, an application, etc., and the modem processor mainly processes wireless communications.

It can be understood that the above modem processor may also not be integrated into the processor. Moreover, the processor can serve as an implementation element of the processing unit described above to execute the same or similar functions as the processing unit.

The mobile phone also includes a power supply (such as a battery) that supplies power to the various components. The power supply can be logically connected to the processor through a power supply management system to realize managing functions such as charging, discharging, and power management etc. through the power supply management system. Although not shown, the mobile phone may further include a bluetooth module and the like, and details are not described herein again.

It should be noted that the mobile phone is only an example of the terminal 200 device, and is not particularly limited by the present disclosure. The present disclosure can be applied to an electronic device such as a mobile phone or a tablet computer, which is not limited herein.

Reference throughout this specification, the reference terms "an embodiment", "some embodiments", "an example", "a specific example", or "some examples", and the like means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, one skilled in the art may combine the different embodiments or examples described in this specification and features of different embodiments or examples without conflicting with each other.

Although explanatory embodiments have been shown and described, it would be appreciated by one skilled in the art that the above embodiments previously described are illustrative, and cannot be construed to limit the present disclosure. Changes, alternatives, and modifications can be made in the embodiments without departing from scope of the present disclosure.

What is claimed is:

1. A conductive cover assembly of a terminal, wherein the conductive cover assembly comprises:
    a first portion;
    a second portion, wherein a gap is defined between the second portion and the first portion to space the first portion and the second portion apart;
    a conductive suspension strip located within the gap, insulating layers being provided between the conductive suspension strip and the first portion and between the conductive suspension strip and the second portion;
    a connector spanning the gap and connected to the first portion and the second portion respectively;
    a conductive member attached to a side of the connector away from the gap, an end of the conductive member being electrically connected to the first portion; and
    a resilient sheet adapted to be electrically connected to a signal source, the resilient sheet being electrically connected to the conductive member.

2. The conductive cover assembly of the terminal according to claim 1, wherein a thickness of the insulating layer is 0.05 mm to 0.5 mm.

3. The conductive cover assembly of the terminal according to claim 2, wherein the thickness of the insulating layer is 0.3 mm.

4. The conductive cover assembly of the terminal according to claim 1, wherein the conductive suspension strip comprises:
    two first straight sections spaced apart;
    a second straight section, the second straight section being located between the two first straight sections, and the second straight section being located on a side of the first straight section and being parallel to the first straight section; and
    two vertical connection sections, an extending direction of the vertical connection sections being perpendicular to an extending direction of the first straight sections, two ends of each of the vertical connection sections being connected to the corresponding first straight section and second straight section respectively.

5. The conductive cover assembly of the terminal according to claim 4, wherein the corresponding vertical connection section and a sidewall face of the first straight section oriented toward the first portion form a right angle therebetween.

6. The conductive cover assembly of the terminal according to claim 4, wherein the corresponding vertical connection section and a sidewall face of the first straight section oriented toward the second portion form a round corner therebetween.

7. The conductive cover assembly of the terminal according to claim 4, wherein a smooth transition connection is provided between the second straight section and the vertical connection section.

8. The conductive cover assembly of the terminal according to claim 1, wherein the conductive cover assembly comprises a cover body and a cover side plate surrounding a periphery of the cover body, the cover body and the cover side plate defining a mounting cavity with a side open; the connector, the conductive member and the resilient sheet each being located within the mounting cavity, the first portion being configured as the cover side plate, and the second portion being configured as the cover body.

9. The conductive cover assembly of the terminal according to claim 1, wherein the connector, the conductive member and the resilient sheet each are plural, and a plurality of the connectors, a plurality of the conductive members and a plurality of the spring leaves are in one-to-one correspondence.

10. The conductive cover assembly of the terminal according to claim 1, wherein a rear surface of the conductive suspension strip is flush with a rear surface of the second portion.

11. The conductive cover assembly of the terminal according to claim 10, wherein a thickness of the conductive suspension strip in a front-rear direction is smaller than a thickness of the second portion in a front-rear direction.

12. The conductive cover assembly of the terminal according to claim 1, wherein a length of the conductive suspension strip is equal to a length of the gap.

13. The conductive cover assembly of the terminal according to claim 1, wherein the connector is an insulating connector.

14. The conductive cover assembly of the terminal according to claim 13, wherein the connector is an injection-molded connector formed on the conductive cover assembly via an injection molding process.

15. The conductive cover assembly of the terminal according to claim 1, wherein the conductive member is welded to the first portion, or the conductive member is connected to the first portion via a lock screw.

16. A conductive cover assembly of a terminal, comprising:
   a first portion;
   a second portion;
   a conductive strip sandwiched between the first portion and the second portion and separating the first portion from the second portion, a first insulating layer being provided between the conductive strip and the first portion, and a second insulating layer being provided between the conductive strip and the second portion;
   a connector spanning the conductive strip and connected to the first portion and the second portion respectively;
   a conductive member attached to a side of the connector away from the conductive strip, an end of the conductive member being electrically connected to the first portion; and
   a resilient sheet adapted to be electrically connected to a signal source, the resilient sheet being electrically connected to the conductive member.

17. A terminal, comprising:
   an antenna assembly; and
   a conductive cover assembly comprising:
      a first portion;
      a second portion, wherein a gap is defined between the second portion and the first portion to space the first portion and the second portion apart;
      a conductive suspension strip located within the gap, insulating layers being provided between the conductive suspension strip and the first portion and between the conductive suspension strip and the second portion;
      a connector spanning the gap and connected to the first portion and the second portion respectively;
      a conductive member attached to a side of the connector away from the gap, an end of the conductive member being electrically connected to the first portion; and
      a resilient sheet adapted to be electrically connected to a signal source, the resilient sheet being electrically connected to the conductive member;
   wherein the antenna assembly is electrically connected to the first portion.

18. The terminal according to claim 17, wherein the antenna assembly comprises:
   a signal source;
   a matching circuit, one end of the matching circuit being electrically connected to the resilient sheet, the other end being electrically connected to the signal source;
   a first tuner, electrically connected to the first portion and an earthing point respectively; and
   a second tuner spaced apart from the first tuner, the second tuner being electrically connected to the first portion and the earthing point respectively.

19. The terminal according to claim 17, wherein the terminal further comprises an earphone jack, a universal serial bus (USB) jack, a fingerprint recognition component, a speaker component or a side key, disposed on the conductive cover assembly and spaced apart from the first portion of the conductive cover assembly.

20. The terminal according to claim 19, wherein a minimum distance between the first portion and one of the earphone jack, the USB jack, the fingerprint recognition component, the speaker component and the side key is 0.5 mm.

* * * * *